Luther G. Simjian
INVENTOR.

BY Ervin B. Steinberg
AGENT.

Luther G. Simjian
INVENTOR.

United States Patent Office 3,428,948
Patented Feb. 18, 1969

3,428,948
POSTAGE METERING SYSTEM
Luther G. Simjian, Greenwich, Conn., assignor to General Research, Inc., Greenwich, Conn., a corporation of Connecticut
Filed Dec. 13, 1965, Ser. No. 513,322
U.S. Cl. 340—147
Int. Cl. H04l 23/00; H04m 11/08
17 Claims

ABSTRACT OF THE DISCLOSURE

A postage meter includes a credit register settable by an electrical signal. Responsive to the receipt of a coded electrical signal from a remote central station and sent via a data link the register is set to reflect a predetermined credit increment. Image recording means are provided and actuated to record periodically numerical values indicative of the status of the register, thus producing a documentary record. Signaling means are actuated when the available credit falls below a predetermined amount.

---

This invention concerns a postage metering system comprising one or more individual postage meters which are controlled from a central station, wherein each such postage meter is adapted to dispense validating indicia associated with a monetary value, and wherein the central station maintains control over the total monetary value which a particular meter is authorized to dispense.

The present application is related also to my copending application for U.S. Letters Patent Ser. No. 243,209, filed on Dec. 5, 1962, entitled "Postage Metering System" now U.S. Patent 3,255,439, dated June 7, 1966.

The general arrangement of interconnecting a plurality of postage meters disposed at various subscriber stations with a central station and maintaining credit supervision at the central station is disclosed in the patent application identified hereinabove. The present invention concerns a particular arrangement wherein the central station, by means of suitable signals over a data link, provides a sum of credit to a particular postage meter and wherein operation of the meter is precluded when such credit has been exhausted. Upon providing additional credit to the meter by a new set of signals, the meter is unblocked and is operable again until the credited sum is exhausted once again.

In this way, all credit information is maintained at a central station to enable centralized billing and the use of modern high-speed computing equipment. This arrangement, moreover, obviates the need for the meter movement to be taken periodically to a local Post Office for the payment of money and setting of credit commensurate with the amount of money paid.

Other features described hereafter concern the provision of a signaling means which is actuated when a certain sum of credit is reached, thereby warning the operator that the credit soon will be exhausted, the provision of an image recording means associated with a counter of the meter in order to furnish periodically a record of the meter operation, and means for actuating such recording means to produce a record for audit purposes at preprogrammed or random instances.

One of the principal objects of this invention is, therefore, the provision of a new and improved postage metering system.

Another important object of this invention is the provision of a system comprising at least one postage meter disposed at a subscriber station and coupled to a remote central station, such meter having a control means which is controlled by signals from the central station to supervise the amount of credit available for imprinting indicia which represent a monetary value, particularly postage.

Another object of this invention is the provision of a postage meter having a credit register which is adapted to be controlled by electrical signals in such a way that a certain sum of credit is made available and operation of such meter is stopped when the credit is exhausted.

A further object of this invention is the provision of a control means associated with a postage meter, such control means including a credit register and means associated with the credit register to provide a signal when a predetermined credit balance is reached during the course of the indicia dispensing operation.

Another and further object of this invention is the provision of a remote controlled credit arrangement operable with a postage meter and the use of an image recording means to provide a periodic record of the status of the meter, such record being useful for auditing purposes.

Further and still other objects of this invention will be apparent more clearly by reference to the following description when taken in conjunction with the accompanying drawings, in which.

Figure 1:
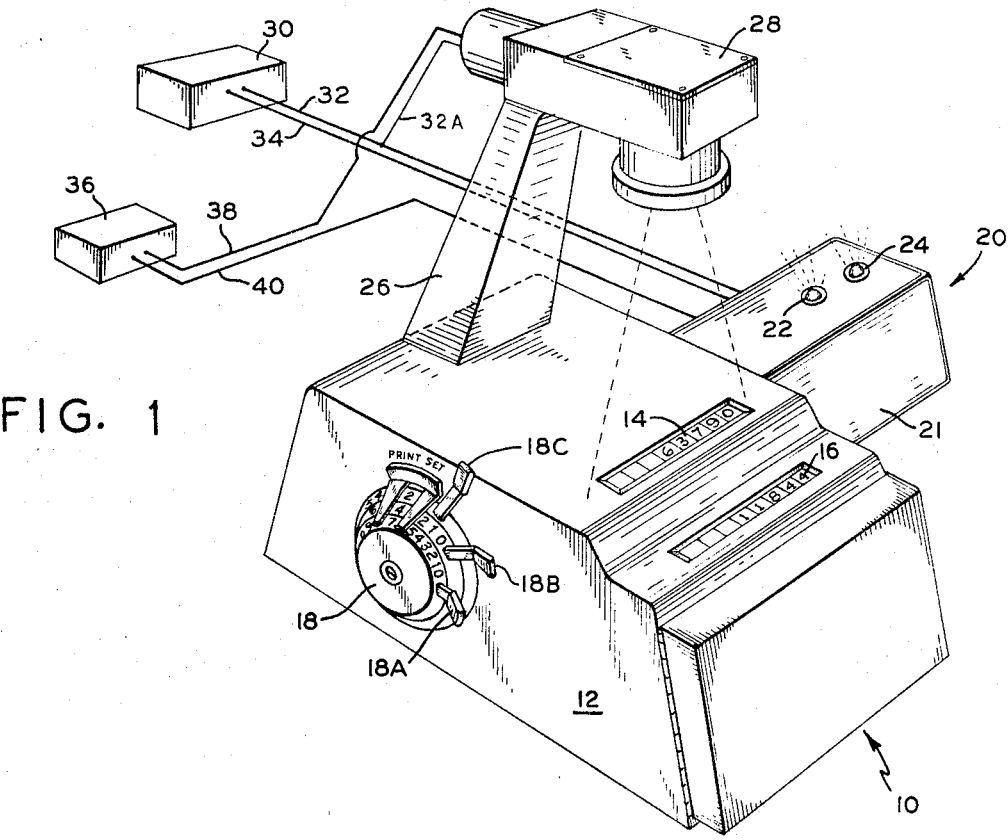
FIGURE 1 is a perspective view of the postage meter used at the subscriber station.

Referring now to the figures and FIGURE 1 in particular, numeral 10 generally identifies a commercially available postage meter, such as the Postalia Postage Meter, Model KF 1501, available from the Postalia Division of the Tele-Norm Corporation, 32–31 57th Street, Woodside, New York, New York 11377. The meter comprises quite conventionally a housing 12, an ascending mechanical counter 14 displaying indicia of the total value of the indicia imprinted and dispensed, a descending mechanical counter 16, and a control means 18 which is provided with three selectively settable levers 18A, 18B and 18C, each settable from the digits 0 to 9 for adjusting the value of the postage to be imprinted. One lever controls the cent value from 0 to 9, another lever determines the value of the ten-cent units, and the last lever the dollar value from 0 to $9. Hence, the value of the indicia which can be imprinted may be varied between zero and $9.99.

Any imprinting operation accomplished is reflected on the counters 14 and 16 in such a way that the counter 14 displays numerals corresponding to the total value of the postage dispensed since the counter's last resetting, while the counter 16 indicates the credit balance still remaining. The indicia dispensing and imprinting mechanism is disposed at the underside of the meter and is not visible in FIGURE 1. This briefly describes the standard portions of the meter which are important to the present invention.

The modifications made to the standard meter include the provision of a housing 21 which encloses a further control means 20. This control means is mechanically coupled to the mechanism controlling the counter 14 or the counter 16. This control means 20 is described in greater detail in conjunction with FIGURES 2 and 3. The housing 21 includes also two signal means 22 and 24, e.g. electric light means, to indicate the condition when the meter credit balance is less than a predetermined amount and the condition when all credit is exhausted.

Moreover, there is provided a column 26 which supports an electrically operated image recording means 28, such as an electrically operated photographic camera having a solenoid actuated shutter and a motor driven film advance. The recording means is positioned so that its lens views the data displayed by the numerals of the ascending counter 14. Alternatively, the camera may be positioned to view the descending counter 16, or both counters 14 and 16. The camera 28 is actuated periodically to provide a record of the monetary status of the postage meter.

The control means 20 disposed in the housing 21 is coupled to signals from a remote central station by means of a junction box 30 via conductors 32, 34, and the postage meter and the camera are connected to a local power supply for receiving operating power via conductors 38, 40, and a junction box 36.

Figure 2:
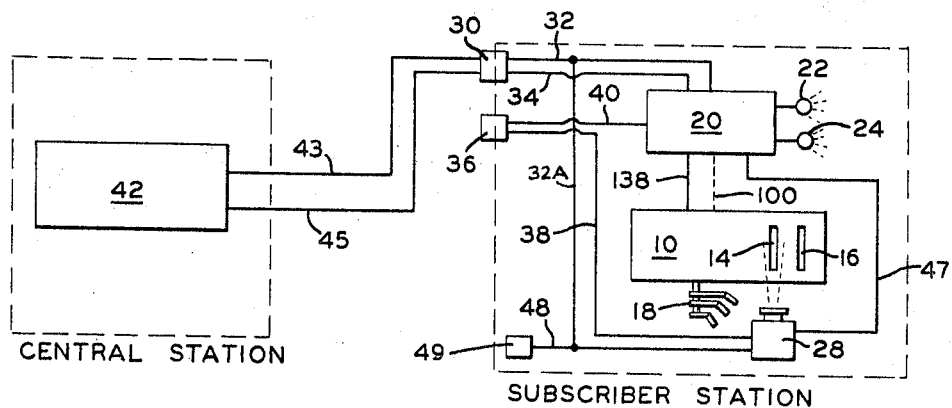
FIGURE 2 is a block diagram of the entire system comprising a remote central station and a postage meter disposed at a subscriber station, both stations being interconnected by a data link.

The general operation of the postage meter system will be apparent by reference to FIGURE 2. The central station 42 includes a signal generating means (not shown) to generate coded electrical signals which are sent via the conductor 43, junction box 30 and the conductor 32 to the control means 20 contained in the housing 21. This control means includes a credit register which is pulsed by the signals from the central station and set to information representing a credit balance against which postage is dispensed. The conductor 43 is used also to actuate the camera 28, preferably substantially at the same time when credit signals are provided to the postage meter. Such actuating signal reaches the camera via the junction box 30 and conductors 32 and 32A. The camera may be actuated also in response to conditions or signals in the control means 20 via a conductor 47. Still further, the camera 28 may be actuated via a conductor 48 from a local control station 49. This control station 49 may actuate the camera 28 at random intervals to cause a surprise audit or, alternatively, the numeral 49 may represent a clock mechanism which actuates the camera at time dependent intervals, for instance, once every 24 hours.

When the credit balance in the postage meter reaches a predetermined low value, for instance, $50.00, the signal lamp 22 is energized to indicate to the attendant that additional money is required if operation of the meter is to be continued in excess of this reserve amount. The attendant may advise the central station 42 that more credit is required, such advice being communicated by telephone or other suitable automatic signaling means, as for instance conductors 34 and 45. The operator at the central station may issue additional credit in a fixed amount, as for instance $200.00, and provide the corresponding signal via the conductor 43. The receipt of this signal adjusts the credit register of the control means 20 to information representative of the increased balance and since upon such occurrence the credit is in excess of $50.00, lamp 22 is de-energized. Lamp 24 is provided to signal the condition when all credit is exhausted and further operation of the postage meter is precluded.

Numeral 100 indicates a mechanical coupling link between the standard counters 14 and 16 and the control means 20. This link is necessary since any dispensing operation as normally registered on the counters 14 and 16 must reflect itself in the credit register of the control means 20 to cause an adjustment of the information therein, causing a commensurate decrease of the credit balance. Numeral 138 indicates an electrical connection which actuates a suitable disabling means to preclude operation of the postage meter 10 when the credit register of the control means 20 determines that the credit provided is exhausted.

Accounting at the central station 42 may be accomplished by means of punching a tabulating card whenever a sum of credit is provided to a subscriber station. Alternatively, other centralized computing means may be employed, such as magnetic or punched data storage means as used in telephone systems. While only a single subscriber station is shown connected to the central station, the system described herein obviously contemplates the connection of a plurality of subscriber stations to a central station. Each subscriber station is provided with its particular address signal as is well understood by those skilled in the art.

Figure 3:
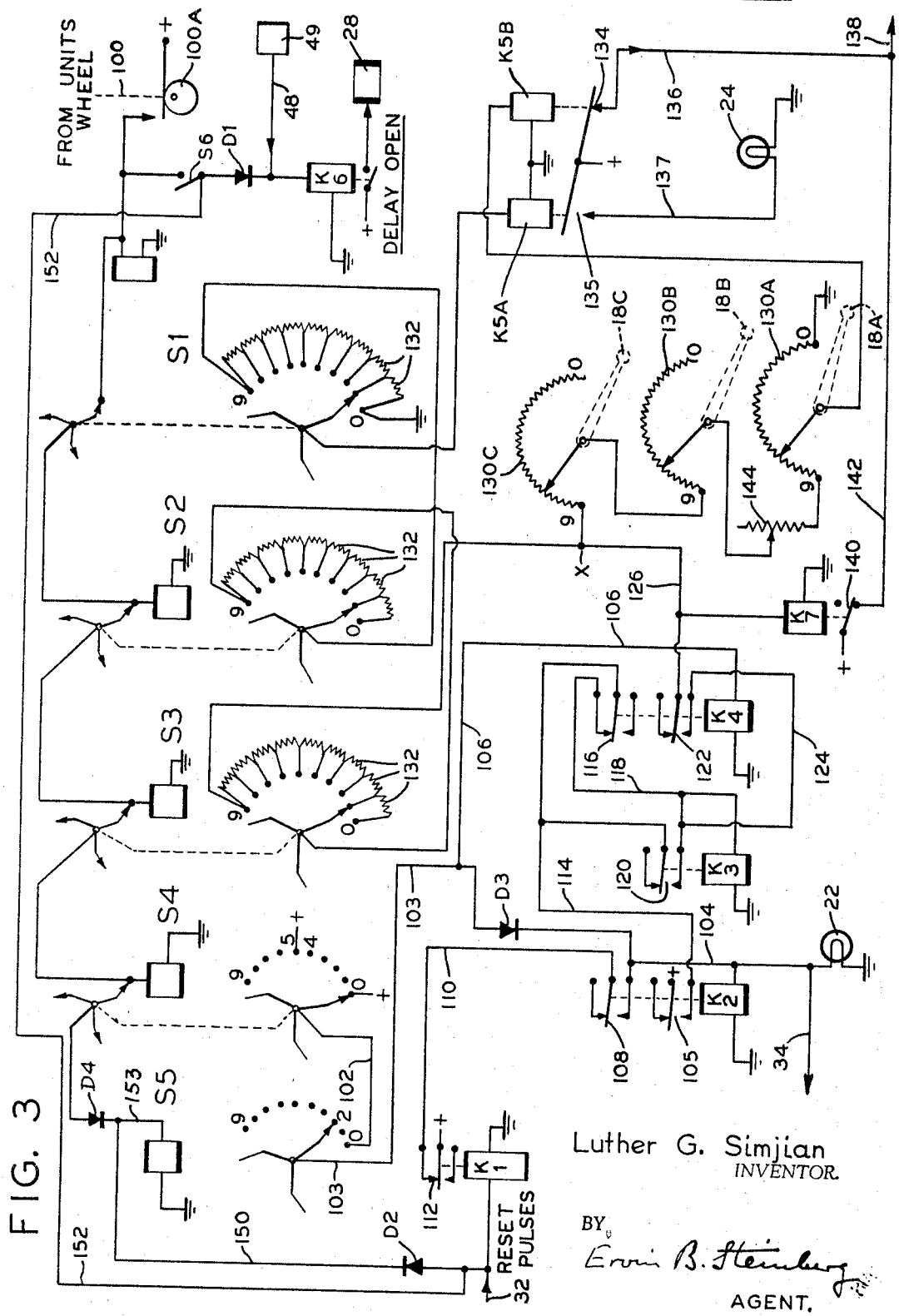
FIGURE 3 is a schematic electrical circuit diagram of the control means coupled to a standard postage meter in order to provide operation in accordance with the teachings of this invention.

The electrical circuit of the further control means 20 is shown in FIGURE 3. The circuit shown represents for illustrative purposes a five-digit credit system (up to $999.99) with the provision of a fixed sum of credit obtainable from the central station 42, namely increments of $100.00; the provision of activating the signal light 22 when the remaining credit in the postage meter reaches $50.00 or less, and a credit check on the dollar, ten-cent and cent units when a credit of $9.99 or less is reached, thus assuring that the control levers 18A, 18B and 18C do not cause the dispensation of a larger amount of postage than is permissible by the credit balance in the credit register of the meter.

The credit register comprises five dual wiper stepping switches identified by symbols S1, S2, S3, S4 and S5. The switches are connected to each other to form a decade counter. These stepping switches are available commercially under the name "Unipulser" from the Durant Manufacturing Company, 622 North Cass St., Milwaukee, Wis. One wiper contact of each switch, the lower contact as depicted in FIGURE 3, rotates past a set of stationary contact pins 0 to 9, while a second wiper contact, the upper one as shown in FIGURE 3, is used to operate the next higher order switch. The wiper contacts are mechanically linked and pulsed to the next succeeding position by associated electromagnetic coils.

The switch S1 is used for the single cent units, switch S2 for the ten-cent units, switch S3 for single dollars, switch S4 for the ten-dollar units, and switch S5 for the one-hundred dollar units.

As shown, the credit register comprising the switches S1 to S5 is set to information or positions representing $201.11 of credit. The circuit is arranged so that pulses generated responsive to the operation of the contactor 100A, which is mechanically coupled via a linkage 100 to the unit (cent) wheel of counter 14, cause the credit information as represented by the positions of the decade counter switches to decrease by an amount equal to the value of the indicia imprinted.

When the switch S6 is closed, each operation of the contactor 100A establishes an electrical circuit via the diode D1 to the relay K6, causing the closing of the associated relay contact to operate the electrically operated camera 28. The relay K6 is selected to pull in fast and drop out slowly so as to hold the relay closed during the particular cycle of operation and energize the solenoid (not shown) of the camera shutter mechanism. Also, in this way, the image recording device is rendered insensitive to several fast pulses in brief succession as will occur when several cent units are registered during a single dispensing operation, e.g. a postage of five cents. Thus, the recording means 28 obtains a record of the data displayed by the counter 14 during each dispensing cycle. This frequent recording may be found too expensive and in order to alter this mode of operation, the switch S6 may be opened as shown. The relay K6 can be energized also by a signal from the local control station 49 via the conductor 48. As stated above, such a signal may serve for auditing purposes and be initiated at random or at time dependent intervals. The record provided by the recording means 28 when used for auditing purposes can replace the periodic postcard type report required at the present time by the postal authorities. The diode D1 prevents a feedback signal to the register when the switch S6 is closed and a signal is sent from the control station 49.

As operation of the postage meter occurs, the credit register represented by the switches S1 to S5 is changed to constantly reflect the amount of credit remaining. When an amount of postage equal to $151.11 has been issued and $50.00 credit remains, the lower wiper of switch S4 will be positioned at the "5" position. A voltage applied to the stationary "5" contact pin operates the relays K2 and K4. The relay K2 is operated via the circuit which includes the pin "5," the wiper arm, the conductors 102, 103 (the wiper arm of switch S5 being at the zero position), diode D3 and conductor 104. Relay K4 is energized via the conductors 102, 103 and 106. The closed contacts 108 of the relay K2 hold the relay K2 energized via the conductor 110 and the normally closed relay contact switch 112 of the relay K1. Closed contact switch 112, via the conductor 110, closed switch 108 and conductor 104 applies also electrical energy to the signal light 22, indicating that the remaining credit has fallen to $50.00 or less. A similar signal is made apparent at the central station 42 via the conductor 34 and conductor 45 in FIGURE 2.

As further operation of the postage meter takes place and the movable wiper arm of the switch S4 rotates to the "4" position, the relay K4 is de-energized, drops out, and a circuit is established from the closed contacts 105 on relay K2 via the conductor 114, contacts 116 on the relay K4, and the conductor 118 to the coil of relay K3 which operates after a slight delay, it being selected to be a time delay relay. As the dispensing of postage progresses and a point is reached when the switch S4 reaches its zero contact, a credit of $9.99 remaining, a voltage from the "0" contact on switch S4 operates again the relay K4 via the conductor 102, switch S5, conductors 103 and 106. Since at this instant the relay K3 is operated, a current path exists from the contact 105 of relay K2, via the conductor 114, contact 120 of relay K3, conductor 124, contact 122 of relay K4 and conductor 126 to a point designated X in FIGURE 3.

Figure 4:
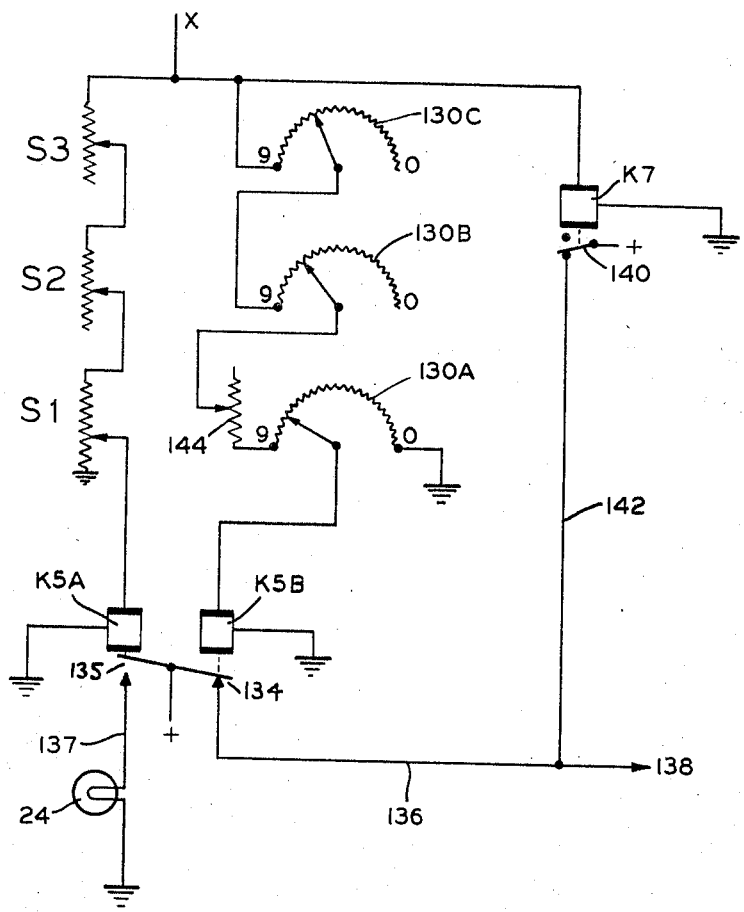
FIGURE 4 is a schematic circuit diagram of a portion of FIGURE 3.

The control levers 18A, 18B and 18C have respective potentiometers coupled to them as shown by numerals 130A, 130B and 130C respectively. The lower stationary switch contacts associated with switches S1, S2 and S3 have resistors wired between each contact from "0" to "9," such as the resistors 132. An electrical bridge network is thus formed, see FIGURE 4, which includes in the measuring arm of the bridge a sensitive polarized relay K5A and K5B. This relay is, for instance, a "Micropositioner" device obtainable from the Barber-Colman Company, Rockford, Illinois. The Micropositioner is a polarity sensitive relay so that current flow will close one or the other of its contacts from the normally floating neutral position.

As long as the voltage value represented by the switches S1, S2 and S3, one branch of the bridge circuit, is greater than the value represented by the potentiometers 130A, 130B, 130C, the other branch of the bridge circuit and representing the amount of postage to be dispensed, then the relay coil K5A is energized and local power is applied to the postage meter via the contact 134, conductor 136 to the line 138. Until the credit value of $9.99 was reached local power was available to the postagemeter through the contacts 140 of the relay K7 and the conductor 142. When the voltage was applied to the point X, relay K7 became energized and the local power for causing operation of the postage meter was switched to the relay K5A. A trimming resistor 144 allows the bridge circuit to be adjusted to a sensitivity which is equivalent to a one-cent value.

With a voltage applied at point X, if the control levers 18A, 18B, 18C are set to a value greater than the credit remaining as represented by the switches S1, S2 and S3, the relay coil K5B is energized, causing the closing of contact 135 and the removal of power from the conductor 136 and the line 138. Simultaneously a further signal means 24 is energized via the conductor 137 to indicate the condition of exhausted credit.

When the postage meter is a manually operated one, the line 138 leads to a locking device (not shown) which when de-energized precludes operation of the meter and which when energized permits operation of the meter. A spring biased bolt engaging a ratchet is typical of such a locking means.

When the relay K2 is operated, indicating $50.00 credit remaining and at any time thereafter, pulses from the central station 42 via the conductor 32 provide a new credit increment. In this example for providing for instance a credit in the additional value of $200.00, pulses equal to the complement of "2," or eight signal pulses, are used to pulse the coil associated with the switch S5, via the diode D2 and conductors 150 and 153. Simultaneously, these signals operate the relay K1, in order to de-energize the relay K2, and, hence, to remove the power from point X. The setting of the register switch S5 to a position representing $200.00 provides a credit for $200.00 plus that balance which remained in the register when the signals from the central station 42 were provided. The transmission of the signals from the central station via the conductor 32 also causes actuation of the relay K6 via the conductor 152 and diode D1, thus actuating the image recording means and providing a record of the standing of the counter 14 at the time when a new sum of credit was provided. The diodes D2, D3 and D4 are blocking devices for preventing operation of circuit components in response to signals flowing in the reverse direction.

It will be apparent that, as what may be termed, the reserve balance of $50.00 described heretofore, may be changed to another value by applying the electrical potential to a contact pin other than the pin "5," of switch S4. In this way the signal lamp 22 is energized at a different credit balance.

Similarly, by providing a different quantity of pulses via the line 32, other sums of credit may be made available, for instance $500.00 instead of the $200.00 described. Pulsing the highest order counter in the register as described above provides a very simple arrangement for adjusting the credit in the meter without disturbing any remaining credit balance. Also, it overcomes the need for pulsing the register upward by feeding the pulses into the register at the lowest denomination.

When a plurality of postage meters is coupled to a central station intermediate coding means are required in order to cause actuation only of the selected meter. The use of such coding means is indicated in block form in my patent application supra and is well known to those skilled in the art. Each of the postage meters is responsive then only to a particular address code.

In a further variation, the control means 20 per FIGURE 3 may be made removable from the postage meter any reset to an increased credit balance at a special junction box which is connected to the central station 42. Thus, in an installation where several postage meters are present and owned by the same party, a single data link to the central station will suffice. After credit has been made available to a particular register, it is restored on the meter, e.g. by a plug-in connection which includes the mechanical linkage 100, local operating power, and signaling lines 32 and 34.

The credit register, of course, is a sealed unit in order to preclude tampering. Similarly, the camera may be made tamperproof. The signals for adjusting the register do not need to be the simple pulses described, but may be of a complex wave shape, using suitable scrambling and unscrambling means, as is well known in the field of data transmission.

The recording means 28, while described primarily as a photographic recording means, may comprise also a magnetic recording means or other data recording and storage means.

Finally, while the credit register shown above comprises a set of rotary stepping switches, the register may be constructed, alternatively, from solid-state components or magnetic memory units as are used in digital computing systems for information storage. The stepping switches used heretofore are merely illustrative of a typical register embodiment.

What is claimed is:

1. In a postage metering system, the combination of:
    a subscriber station comprising a postage meter including imprinting means for recurrently and selectively imprinting indicia representative of monetary value, and control means coupled to said imprinting means for selectively adjusting the indicia to be imprinted by said meter;
    a remote station including a signal generating means for providing signals to said postage meter;
    a data transmitting link coupling said postage meter at said subscriber station to said remote station;
    a further control means coupled to said meter and including a credit register adapted to store information related to the amount of credit balance present in said meter and against which individual imprinting operations are effected;
    means coupled to said credit register for changing the credit information stored by said register in response to each imprinting operation whereby to adjust the credit information to a new balance, and
    means coupled to said further control means and said data link for receiving signals from said remote station through said data link to change the information in said credit register to provide an increased credit balance.

2. In a postage metering system as set forth in claim 1 and including a means for precluding operation of said imprinting means when the credit balance is exhausted.

3. In a postage metering system as set forth in claim 1 and including a means coupled to said credit register and to said control means for selectively adjusting the indicia to be imprinted for comparing the setting of said latter control means with the information related to the prevailing credit balance and precluding operation of said imprinting means when the credit balance is insufficient to imprint the indicia adjusted.

4. In a postage metering system as set forth in claim 1 and including a signaling means adapted to provide a signal when the information representative of the credit balance assumes a predetermined value.

5. In a postage metering system as set forth in claim 1 wherein said credit register comprises a plurality of settable decade counters and the signals from said remote station when received by said means coupled to said credit register cause a change in the setting of at least one of said counters.

6. In a postage metering system as set forth in claim 1 and including a mechanical counter which displays data indicative of the monetary value of the indicia imprinted by said meter and said further control means is coupled to said counter.

7. In a postage metering system as set forth in claim 1 wherein said credit register comprises a plurality of settable decade counters adapted to be set to information representative of a diminished credit balance by discrete electrical pulses responsive to each indicia imprinting operation, and which in response to signals from said remote station are adapted to be set to information representative of an increased credit balance.

8. In a postage metering system as set forth in claim 1 and including a signaling means disposed at said postage meter, said signaling means having a first and a second condition, a means coupled to said register for causing said signaling means to assume its second condition when the information representative of the credit balance assumes a predetermined value, and causing said signaling means to revert to its first condition in response to said means coupled to said further control means receiving signals from said remote station which cause an increased balance whose value exceeds said predetermined value.

9. In a postage metering system as set forth in claim 8 and including a means coupled to said register and said control means for said indicia for comparing the setting of said latter control means with the information related to the prevailing credit balance and precluding operation of said imprinting means when the credit balance is insufficient to imprint the indicia adjusted.

10. In a postage metering system as set forth in claim 9 and including a means for precluding operation of said imprinting means when the credit balance is exhausted.

11. In a postage metering system, the combination of:
    a subscriber station comprising a postage meter having imprinting means for recurrently and selectively imprinting indicia representative of monetary value, control means coupled to said imprinting means for selectively adjusting the indicia to be imprinted, and a counter displaying data representative of the indicia imprinted by said meter;
    a remote station including a signal generating means for providing signals to said postage meter;
    a data transmitting link coupling said postage meter at said subscriber station to said remote station;
    a further control means coupled to said meter and including a credit register adapted to store information related to the amount of credit balance present in said meter and against which individual imprinting operations are effected;
    means coupled to said credit register for changing the credit information therein in response to each imprinting operation whereby to adjust the credit balance;
    means coupled to said further control means and said data link for receiving signals from said remote station through said data link to change the information in said credit register to provide an increased credit balance;
    an image recording means disposed to view the data of said counter, and means for actuating said recording means whereby to record an image of said data.

12. In a postage metering system as set forth in claim 11 wherein said means for actuating said recording means is coupled to said data link to cause actuation of said recording means in response to a signal from said remote station.

13. In a postage metering system as set forth in claim 11 wherein said counter displaying data is an ascending numerical counter which sums the monetary value of the indicia imprinted.

14. In a postage metering system as set forth in claim 11 and including means for actuating said recording means in response to a signal from said remote station, said signal being supplied substantially concurrently with the signal for changing the information in said credit register and providing an increased credit balance.

15. In a postage metering system as set forth in claim 11 wherein said means for actuating said recording means is coupled to a timing means to cause actuation of said recording means in response to a time dependent signal.

16. In a postage metering system as set forth in claim 11 wherein said recording means is a photographic camera.

17. In a postage metering system as set forth in claim 1 wherein said recording means is an electrically actuated photographic camera which is operated in response to periodic electrical signals.

(References on following page)

References Cited

UNITED STATES PATENTS

| | | | |
|---|---|---|---|
| 2,998,188 | 8/1961 | Mast et al. | 235—133.5 |
| 3,035,769 | 5/1962 | Reumerman et al. | 235—92 |
| 3,057,547 | 10/1962 | Adler et al. | 235—1 |
| 3,133,700 | 5/1964 | Schaerer et al. | 235—101 |
| 3,221,934 | 12/1965 | Klaffky | 179—2 |
| 3,288,934 | 11/1966 | Haydon | 235—132 |

DONALD J. YUSKO, *Primary Examiner.*

U.S. Cl. X.R.

179—2; 235—101